US012583040B2

(12) United States Patent
Fu

(10) Patent No.: US 12,583,040 B2
(45) Date of Patent: Mar. 24, 2026

(54) TOOL HOLDER FOR TOOL ASSEMBLY AND TOOL ASSEMBLY COMPRISING TOOL HOLDER

(71) Applicant: MAQ AB, Saltsjö-Boo (SE)

(72) Inventor: Qilin Fu, Solna (SE)

(73) Assignee: MAQ AB, Saltsjö-Boo (SE)

( * ) Notice: Subject to any disclaimer, the term of this patent is extended or adjusted under 35 U.S.C. 154(b) by 442 days.

(21) Appl. No.: 17/914,329

(22) PCT Filed: Mar. 31, 2020

(86) PCT No.: PCT/EP2020/059053
§ 371 (c)(1),
(2) Date: Sep. 24, 2022

(87) PCT Pub. No.: WO2021/197577
PCT Pub. Date: Oct. 7, 2021

(65) Prior Publication Data
US 2023/0116863 A1      Apr. 13, 2023

(51) Int. Cl.
*B23C 5/00* (2006.01)
*B23B 27/00* (2006.01)
*B23B 29/02* (2006.01)
(52) U.S. Cl.
CPC ............ *B23C 5/003* (2013.01); *B23B 27/002* (2013.01); *B23B 29/022* (2013.01); *B23C 2250/16* (2013.01)
(58) Field of Classification Search
CPC . B23B 49/022; B23B 27/002; B23B 2250/16; B23B 2251/70; B23C 5/003; B23C 2250/16; B23D 2277/10
See application file for complete search history.

(56) References Cited

U.S. PATENT DOCUMENTS 3,242,791 A * 3/1966 Smith ................... B23B 29/022
188/379
3,559,512 A * 2/1971 Aggarwal ................. F16F 7/10
188/322.5
(Continued)

FOREIGN PATENT DOCUMENTS

CN          1614199 A       5/2005
CN       204673298 U       9/2015
(Continued)

OTHER PUBLICATIONS

PCT International Search Report and Written Opinion for International Application No. PCT/EP2020/059053 mailed Feb. 18, 2021, 12 pages.

*Primary Examiner* — Ryan Rufo
(74) *Attorney, Agent, or Firm* — RMCK Law Group, PLC

(57) ABSTRACT

A tool holder, for a tool assembly, comprising a tubular element having a cavity and a central axis; a damping mass arranged within the cavity and movable radially with respect to the central axis and relative to the tubular element; an adapter having a rear part fixed to the tubular element, and a front part for connection to an end effector of the tool assembly, the rear part comprising an opening, and the damping mass is at least partly received in the opening with a radial clearance; and an elastic element positioned between the adapter and the damping mass, the elastic element being arranged to support the damping mass and to damp radial vibrational movements of the damping mass relative to the tubular element, and the elastic element comprising a front surface substantially perpendicular to the central axis and a rear surface substantially perpendicular to the central axis.

10 Claims, 8 Drawing Sheets

(56) References Cited

U.S. PATENT DOCUMENTS

| | | | | |
|---|---|---|---|---|
| 3,598,498 | A * | 8/1971 | Holmen | F16F 7/10 |
| | | | | 408/143 |
| 3,838,936 | A * | 10/1974 | Andreassen | F16F 7/108 |
| | | | | 409/141 |
| 4,553,884 | A * | 11/1985 | Fitzgerald | B23B 29/022 |
| | | | | 82/900 |
| 6,076,999 | A * | 6/2000 | Hedberg | B23B 27/007 |
| | | | | 407/66 |
| 7,661,912 | B2 * | 2/2010 | Onozuka | B23C 5/003 |
| | | | | 409/141 |
| 7,681,869 | B2 * | 3/2010 | Digernes | F16F 7/108 |
| | | | | 267/137 |
| 9,027,720 | B2 * | 5/2015 | Ogata | F16F 7/08 |
| | | | | 188/380 |
| 10,179,367 | B1 * | 1/2019 | Lo | F16F 15/124 |
| 10,376,968 | B1 * | 8/2019 | Lo | B23C 5/003 |
| 10,632,583 | B1 * | 4/2020 | Giannetti | F16F 7/108 |
| 11,458,544 | B2 * | 10/2022 | Fu | B23C 5/003 |
| 11,583,937 | B2 * | 2/2023 | Jensvold | B23B 29/022 |
| 2005/0258580 | A1 * | 11/2005 | Digernes | F16F 7/108 |
| | | | | 267/137 |
| 2015/0258612 | A1 | 9/2015 | Frota de Souza Filho | |
| 2016/0008892 | A1 * | 1/2016 | Haimer | B23B 31/0261 |
| | | | | 279/102 |

| | | | | |
|---|---|---|---|---|
| 2016/0067787 | A1 | 3/2016 | Giannetti | |
| 2016/0199918 | A1 | 7/2016 | Langbein et al. | |
| 2016/0311031 | A1 * | 10/2016 | Giannetti | B23B 29/022 |
| 2017/0197251 | A1 * | 7/2017 | Nakatani | F16F 15/08 |
| 2018/0009042 | A1 | 1/2018 | Chen | |
| 2018/0281074 | A1 | 10/2018 | Eichelberger et al. | |
| 2021/0291277 | A1 * | 9/2021 | Fu | F16F 7/108 |
| 2021/0354205 | A1 * | 11/2021 | Jensvold | B23B 29/022 |

FOREIGN PATENT DOCUMENTS

| | | | | |
|---|---|---|---|---|
| CN | 204770750 U | 11/2015 | | |
| CN | 205967458 U | 2/2017 | | |
| CN | 206286562 U | 6/2017 | | |
| CN | 108927538 A * | 12/2018 | | B23B 29/022 |
| CN | 109317706 A | 2/2019 | | |
| EP | 3300820 A1 | 4/2018 | | |
| JP | 03202217 A | 9/1991 | | |
| JP | H05228707 A * | 9/1993 | | |
| JP | 2005186240 A | 7/2005 | | |
| JP | 2010175280 A | 8/2010 | | |
| JP | 2019529141 A | 10/2019 | | |
| KR | 20090107974 A | 10/2009 | | |
| WO | 2018059861 A1 | 4/2018 | | |
| WO | 2019168448 A1 | 9/2019 | | |

* cited by examiner

TOOL HOLDER FOR TOOL ASSEMBLY AND TOOL ASSEMBLY COMPRISING TOOL HOLDER

CROSS-REFERENCE TO RELATED APPLICATIONS

This application is a 371 U.S. National Stage of International Application No. PCT/EP2020/059053, filed Mar. 31, 2020. The disclosure of the above application is incorporated herein by reference in its entirety.

TECHNICAL FIELD

The present disclosure generally relates to tool holders. In particular, a tool holder having an adapter with an opening for receiving a damping mass, a tool assembly comprising such tool holder, a tool holder having an adapter integrated with a tubular element, a tool assembly comprising such tool holder, a tool holder having a damping mass that is balanced prior to assembly of the damping mass into a tubular element, and a tool assembly comprising such tool holder, are provided.

BACKGROUND

A tool assembly may be used in various machining processes, such as milling, turning, boring, grinding and drilling processes. Machining vibrations, also called chatter, occur naturally during machining operations and correspond to the relative movement between the workpiece and the cutting tool assembly. Tool assemblies often use the material removal rate/productivity as a key performance indicator. A high material removal rate requires high speed, high depth of cut and high feed rate. All of the three parameters will tend to increase the vibrations in a machining process.

The vibrations result in waves on the machined surface. In addition, vibrations of the tool assembly are often detrimental and can damage a workpiece and/or the tool assembly itself.

In order to damp vibrations in the tool assembly, the tool assembly may comprise a tool holder having a damping mass inside. Vibrational kinetic energy is transferred to the damping mass to stabilize movements of the tool assembly. WO 2019168448 A1 discloses a mass damper for a cutting tool, the mass damper comprising at least one damping mass; and at least one spring element arranged to support the damping mass. The damping mass may be chamfered on each end.

SUMMARY

One object of the present disclosure is to provide a tool holder for a tool assembly, which tool holder has an improved performance.

A further object of the present disclosure is to provide a tool holder for a tool assembly, which tool holder has an improved surface finish capability.

A still further object of the present disclosure is to provide a tool holder for a tool assembly, which tool holder has an improved damping performance.

A still further object of the present disclosure is to provide a tool holder for a tool assembly, which tool holder enables a damping mass to be positioned close to an end effector of the tool assembly.

A still further object of the present disclosure is to provide a tool holder for a tool assembly, which tool holder has high rigidity.

A still further object of the present disclosure is to provide a tool holder for a tool assembly, which tool holder has an improved balancing.

A still further object of the present disclosure is to provide a tool holder for a tool assembly, which tool holder requires little or no service for a long time period.

A still further object of the present disclosure is to provide a tool holder for a tool assembly, which tool holder enables a simple and/or reliable alignment of a damping mass relative to a tubular element.

A still further object of the present disclosure is to provide a tool holder for a tool assembly, which tool holder has a simple, cost-effective and/or reliable design.

A still further object of the present disclosure is to provide a tool holder for a tool assembly, which tool holder enables a simple, cost-effective and/or reliable assembly.

A still further object of the present disclosure is to provide a tool holder for a tool assembly, which tool holder enables a simple, cost-effective and/or reliable production.

A still further object of the present disclosure is to provide a tool holder for a tool assembly, which tool holder solves several or all of the foregoing objects in combination.

A still further object of the present disclosure is to provide a tool assembly comprising a tool holder, which tool assembly solves one, several or all of the foregoing objects.

According to one aspect, there is provided a tool holder for a tool assembly, the tool holder comprising a tubular element having a cavity and a central axis; a damping mass arranged within the cavity and movable radially with respect to the central axis and relative to the tubular element; an adapter having a rear part fixed to the tubular element, and a front part for connection to an end effector of the tool assembly, the rear part comprising an opening, and the damping mass is at least partly received in the opening with a radial clearance; and an elastic element positioned between the adapter and the damping mass, the elastic element being arranged to support the damping mass and to damp radial vibrational movements of the damping mass relative to the tubular element, and the elastic element comprising a front surface substantially perpendicular to, or perpendicular to, the central axis and a rear surface substantially perpendicular to, or perpendicular to, the central axis.

In many prior art tool holders, the adapter is inserted into the tubular element via an interference fit or a transition fit, and is then secured to the tubular element by means of pins. Such tool holders often require pins with a diameter of at least 5 mm. In order to increase a safety factor, the number of pins are increased and/or the diameter of the pins are increased. This requires a length of a rear part of the adapter along the central axis to be extended. This increased length in turn requires the damping mass to be positioned further away from the end effector.

Since the damping mass of the tool holder according to this aspect is at least partly received in the opening of the adapter, the damping mass can be positioned further forward in the tool holder. The damping mass can thus be positioned close to the front part of the adapter and thereby also close to an end effector of the tool assembly. A distance between a point where external forces act on the tool assembly during machining and a reaction force area on the damping mass can thereby be shortened. In comparison with WO 2019168448 A1 for example, this distance may be reduced with 4 mm. In the design of the tool holder, every single millimeter reduction has a notable impact on the performance of the tool holder. A reduction of this distance by 4 mm may reduce a vibration acceleration amplitude of the tool holder during machining by more than 10%, and reduce a maximum vibration displacement of the tool assembly with 30% or more.

A material removal rate of the tool assembly is in reverse relationship with the maximum vibration displacement. A reduction of the maximum vibration displacement of the tool assembly by 30% will thus result in a 30% higher productivity. The tool holder according to this aspect therefore has an improved surface finish capability.

Furthermore, due to the substantially perpendicular orientations of the front surface and the rear surface of the elastic element, the elastic element will mainly experience shear stress when transmitting vibrations to the damping mass. This enables the elastic element to be made thinner which in turn contributes to reducing the distance between the damping mass and the end effector. A substantially perpendicular surface may be angled from 80 degrees to 100 degrees, such as 85 degrees to 95 degrees, to the central axis.

The tool holder is thus optimized for improved vibration damping performance. At the same time, the tool holder enables a design satisfying the requirements of rigidity, modularity, fatigue strength, balancing of the damping mass and/or coolant conduction.

The opening may be circular. The opening may have an internal diameter that is larger than an external diameter of the damping mass to establish the radial clearance. The damping mass is thus arranged to move within both the cavity and the opening. In addition to radial movements, the damping mass may also move axially with respect to the central axis.

The rear part may be directly or indirectly connected to the tubular element. The rear part may be connected to a front end of the tubular element. Each of the tubular element, the adapter and the elastic element may be concentric with the central axis.

The tool holder may further comprise a tail lock. The tool holder may further comprise a back end.

The tool holder may further comprise a central fluid pipe. The fluid pipe may be arranged to convey coolant towards the end effector. The adapter may comprise one or more coolant channels for conveying the coolant from the fluid pipe to the end effector.

The damping mass may comprise a mass cavity. In this case, the fluid pipe may pass through the mass cavity. The fluid pipe may be rigidly connected to each of the adapter and the tail lock, for example by threads and/or glue.

The front part of the adapter may comprise an interface for connecting the adapter to an end effector. The interface may be a standard arbor interface.

The end effector may be secured to the front part by means of a bolt. As used herein, a front direction of the tool assembly is towards the end effector and a rear direction of the tool assembly is in the opposite direction, e.g. towards the back end.

The elastic element positioned between the adapter and the damping mass may be referred to as a front elastic element. The tool holder may comprise only one elastic element between the adapter and the damping mass.

The rear part may be fixed to the tubular element by means of threads. To this end, the rear part, or a component fixed to the rear part, may comprise an external thread, and the tubular element, or a component fixed to the tubular element, may comprise an internal thread configured to be threadingly engaged by the external thread. The opening may be arranged radially inside the external thread. The opening may at least partly overlap with the external thread along the central axis. A major length of the opening along the central axis, such as the entire length of the opening, may overlap with the external thread along the central axis.

Alternatively, the rear part, or a component fixed to the rear part, may comprise an internal thread, and the tubular element, or a component fixed to the tubular element, may comprise an external thread configured to be threadingly engaged by the internal thread.

Alternatively, or in addition, the rear part may be fixed to the tubular element by means of a cold welding, glue or engineering fit, such as a clearance fit or an interference fit. To lock relative movement between the adapter and the tubular element, brazing or adhesives can be used to form a fixed joint. It is also possible to use pins that do not protrude into the opening.

The tubular element may be configured to be secured to the back end. To this end, the back end may comprise an external thread and the tubular element may comprise an internal rear thread configured to threadingly engage the external thread of the back end.

The tool holder may further comprise a plate positioned between the adapter and the damping mass. In this case, the elastic element may be positioned between the plate and the damping mass. The plate may be a thermal insulation plate. The plate may be circular. The plate may be rigid. A largest dimension of the plate perpendicular to the central axis may be at least four times, such as at least ten times, a thickness of the plate.

The plate positioned between the adapter and the damping mass may be referred to as a front plate. In addition to a front plate between the adapter and the damping mass, the tool holder may further comprise a rear plate between the damping mass and the tail lock.

Each plate may be made a material with low thermal conductivity, such as glass, plastic, wood fibers or other engineering materials. Each plate may also be formed by metallic or nonmetallic materials coated with a surface layer of thermal insulation coating.

The rear part may comprise an adapter aperture. In this case, the plate may be seated in the adapter aperture. This enables an improved alignment of the damping mass with the central axis which in turn improves the performance of the tool assembly. An internal diameter of the adapter aperture may be smaller than an internal diameter of the opening. The adapter aperture may be circular.

The plate may be positioned relative to the adapter by means of an engineering fit. The engineering fit may be a force fit, a transition fit or a clearance fit. The plate may be seated in the adapter aperture by means of the engineering fit. Alternatively, or in addition, the plate may be positioned on the fluid pipe by means of the engineering fit. In any case, the engineering fit contributes to aligning the damping mass with the central axis.

The elastic element may have a thickness of less than 2 mm, such as less than 1.5 mm. In addition to a front elastic element between the adapter and the damping mass, the tool holder may further comprise a rear elastic element between the damping mass and the tail lock. In case a rear plate is provided, the rear elastic element may be arranged between the damping mass and the rear plate.

Each elastic element may be configured to convert vibration energy into heat. Each elastic element may have a frequency dependent stiffness. In this way, a self-tuning effect can be obtained. For example, the elastic element may have a frequency dependent stiffness such that a resonance frequency of the damping mass substantially matches, or matches, a vibration frequency of the tool holder over a vibration frequency range from 100 Hz to 1000 Hz. Materials with such frequency dependent stiffness may have a structural size of 100 nm or less in at least one dimension.

Each elastic element may comprise a material having a shear modulus of ⅓ or less of its Young's modulus. This enables a thickness of the elastic element to be low, when it is displaced substantially perpendicular to the central axis. As a consequence, a reaction force area of the damping mass can be positioned closer to the end effector. Each elastic element may be a viscoelastic element.

The rear surface may be directly connected to the damping mass. A reaction force area of the damping mass is thereby provided in an interface between the rear surface and the damping mass.

The damping mass may be balanced prior to assembly of the damping mass into a tubular element. The balancing may be of any type according to the present disclosure, in particular by providing one or more balancing apertures in the damping mass.

The tool holder may further comprise a lateral stiffness ring, the damping mass may comprise a groove, and the lateral stiffness ring may be seated in the groove and be in contact with the tubular element. The lateral stiffness ring may be configured to promote alignment of the damping mass with the central axis.

The tool holder may comprise a plurality of such lateral stiffness ring s, the damping mass may comprise a plurality of such grooves, and one of the lateral stiffness rings may be provided in each groove. The use of multiple lateral stiffness rings can be used to counteract gravity and centrifugal forces of a heavier damping mass.

The lateral stiffness ring may contribute to less than 30% of a total stiffness for supporting the damping mass.

According to a further aspect, there is provided a tool assembly comprising an end effector and a tool holder, having an adapter with an opening for receiving a damping mass, according to the present disclosure. Examples of end effectors according to the present disclosure are milling heads, boring heads, drilling heads, turning heads and grinding heads.

According to a further aspect, there is provided a tool holder for a tool assembly, the tool holder comprising a tubular element having a cavity and a central axis; a damping mass arranged within the cavity and movable radially with respect to the central axis and relative to the tubular element; an adapter having a rear part integrally formed with the tubular element, and a front part for connection to an end effector of the tool assembly; and an elastic element positioned between the adapter and the damping mass, the elastic element being arranged to support the damping mass and to damp radial vibrational movements of the damping mass relative to the tubular element, and the elastic element comprising a front surface substantially perpendicular to, or perpendicular to, the central axis and a rear surface substantially perpendicular to, or perpendicular to, the central axis. The damping mass and the elastic element may configured according to the first aspect.

Since the adapter and the tubular element are integrally formed according to this aspect, the damping mass can be positioned further forward in the tool holder. The damping mass can thus be positioned close to the front part of the adapter and thereby also close to an end effector of the tool assembly. The integrated adapter and tubular element may be referred to as an integrated member or unitary body.

The tool holder may further comprise a plate positioned between the adapter and the damping mass. The rear part may comprise an adapter aperture. In this case, the plate may be seated in the adapter aperture. This enables an improved alignment of the damping mass with the central axis which in turn improves the performance of the tool assembly. The adapter aperture may be circular. The plate and the adapter aperture may be configured according to the first aspect.

The plate may be positioned relative to the adapter by means of an engineering fit. The engineering fit may be a force fit, a transition fit or a clearance fit.

The elastic element may have a thickness of less than 2 mm, such as less than 1.5 mm. The rear surface may be directly connected to the damping mass.

The damping mass may be balanced prior to assembly of the damping mass into the tubular element. The balancing may be of any type according to the present disclosure, in particular by providing one or more balancing apertures in the damping mass.

The tool holder may further comprise a lateral stiffness ring, the damping mass may comprise a groove, and the lateral stiffness ring may be seated in the groove and be in contact with the tubular element. The lateral stiffness ring may be configured to promote alignment of the damping mass with the central axis. The lateral stiffness ring may contribute to less than 30% of a total stiffness for supporting the damping mass.

According to a further aspect, there is provided a tool assembly comprising an end effector and a tool holder, having an adapter integrated with a tubular element, according to the present disclosure.

According to a further aspect, there is provided a tool holder for a tool assembly, the tool holder comprising a tubular element having a cavity and a central axis; and a damping mass arranged within the cavity and movable radially with respect to the central axis and relative to the tubular element, the damping mass being balanced prior to assembly of the damping mass into the tubular element.

In prior art tool holders, the damping mass is unbalanced after manufacture, but prior to assembly of the tool holder. An unbalancing of 100 g*mm (gram millimeters) or higher is very common in a damping mass with a total mass of 1.5 kg, e.g. due to inaccuracies of the machining process and due to diffusion of material elements inside the damping mass. For example, a tool assembly having a vibration frequency mode near 100 Hz and rotating at 6 000 rpm with a damping mass having an unbalancing of 100 g*mm will pose a cyclic load on the tool holder at 100 Hz. This cyclic load will bring the tool assembly into resonance mode which is very detrimental to the lifetime of the tool assembly and/or support structures therefor.

In some prior art tool holders, the damping mass is balanced after assembly to the tool holder, e.g. after inserting the damping mass into a tubular element and connecting the damping mass to a tail lock. In order to balance the damping mass, one or more holes may be drilled through the tubular element and into the damping mass to remove material from the damping mass. It is however difficult to accurately balance the damping mass by drilling through the tubular element into the damping mass according to the prior art. Moreover, the holes drilled through the tubular element will expose the cavity and the damping mass to the external environment such that fluid and dust may enter and deteriorate the function of the tool holder. The holes drilled through the tubular element might also have a detrimental impact on the overall bending stiffness of the tool holder.

By balancing the damping mass according to this aspect in contrast, the mass of the damping mass can be evenly distributed along the central axis and the tool holder can thereby rotate at high speeds with balancing under control. That is, the damping mass may be balanced to reduce or eliminate resonance of the damping mass. By balancing the damping mass prior to installing the damping mass into the tubular element, a risk for deteriorating functionality of the tool holder, for example by removing material from the damping mass by drilling through the tubular element, can be reduced. Moreover, the balancing can be made more accurate. The tool holder according to this aspect therefore has an improved surface finish capability.

The damping mass may be balanced to satisfy the balancing grade G6.3 according to ISO 1940-1:2003 prior to assembly of the damping mass into the tubular element.

The damping mass may be balanced to satisfy the balancing grade G2.5 according to ISO 1940-1:2003 prior to assembly of the damping mass into the tubular element.

The damping mass may be balanced to satisfy the balancing grade G1 according to ISO 1940-1:2003 prior to assembly of the damping mass into the tubular element.

The damping mass may comprise at least one balancing aperture for the balancing of the damping mass. The damping mass and the at least one balancing aperture may be configured such that the damping mass is better balanced after the at least one balancing aperture has been provided than before the at least one balancing aperture has been provided.

One or more of the at least one balancing aperture may be a hole extending in a radial direction with respect to the central axis. Alternatively, or in addition, one or more of the at least one balancing aperture may be a blind hole.

The tool holder may further comprise a lateral stiffness ring, the damping mass may comprise a groove, and the lateral stiffness ring may be seated in the groove and be in contact with the tubular element. The lateral stiffness ring may contribute to less than 30% of a total stiffness for supporting the damping mass.

According to a further aspect, there is provided a tool assembly comprising an end effector and a tool holder, having a damping mass that is balanced prior to assembly of the damping mass into the tubular element, according to the present disclosure.

Any tool assembly according to the present disclosure may be either stationary or rotated when machining a workpiece. Any tool holder or any tool assembly according to the present disclosure may be modular. The modularity may for example be used to attach different types of end effectors and/or different types of back ends to the tool holder. Due to the ability to mount different types of back ends to the tool holder, the tool holder can easily be adapted to fit a particular support, such as a machine spindle or a tool magazine. Alternatively, or in addition, the modularity may be used to modify the length and/or diameter of the tool holder, e.g. with the same damping mass. Due to the modularity, supply chain stocks of components to the tool holder or the tool assembly can be reduced.

According to one example, there is provided a kit of parts comprising a tool holder according to the present disclosure, a first back end and a second back end, wherein each of the first back end and the second back end is detachably connectable to the tool holder, and wherein the first back end is connectable to a first support of a first size and the second back end is connectable to a second support of a second size, different from the first size.

According to a further example, there is provided a kit of parts comprising a tool holder according to the present disclosure, a first end effector and a second end effector, wherein each of the first end effector and the second end effector is detachably connectable to the tool holder, and wherein the first end effector is of a first type and the second end effector is of a second type, different from the first type.

BRIEF DESCRIPTION OF THE DRAWINGS

Further details, advantages and aspects of the present disclosure will become apparent from the following embodiments taken in conjunction with the drawings, wherein.

Figure 6:
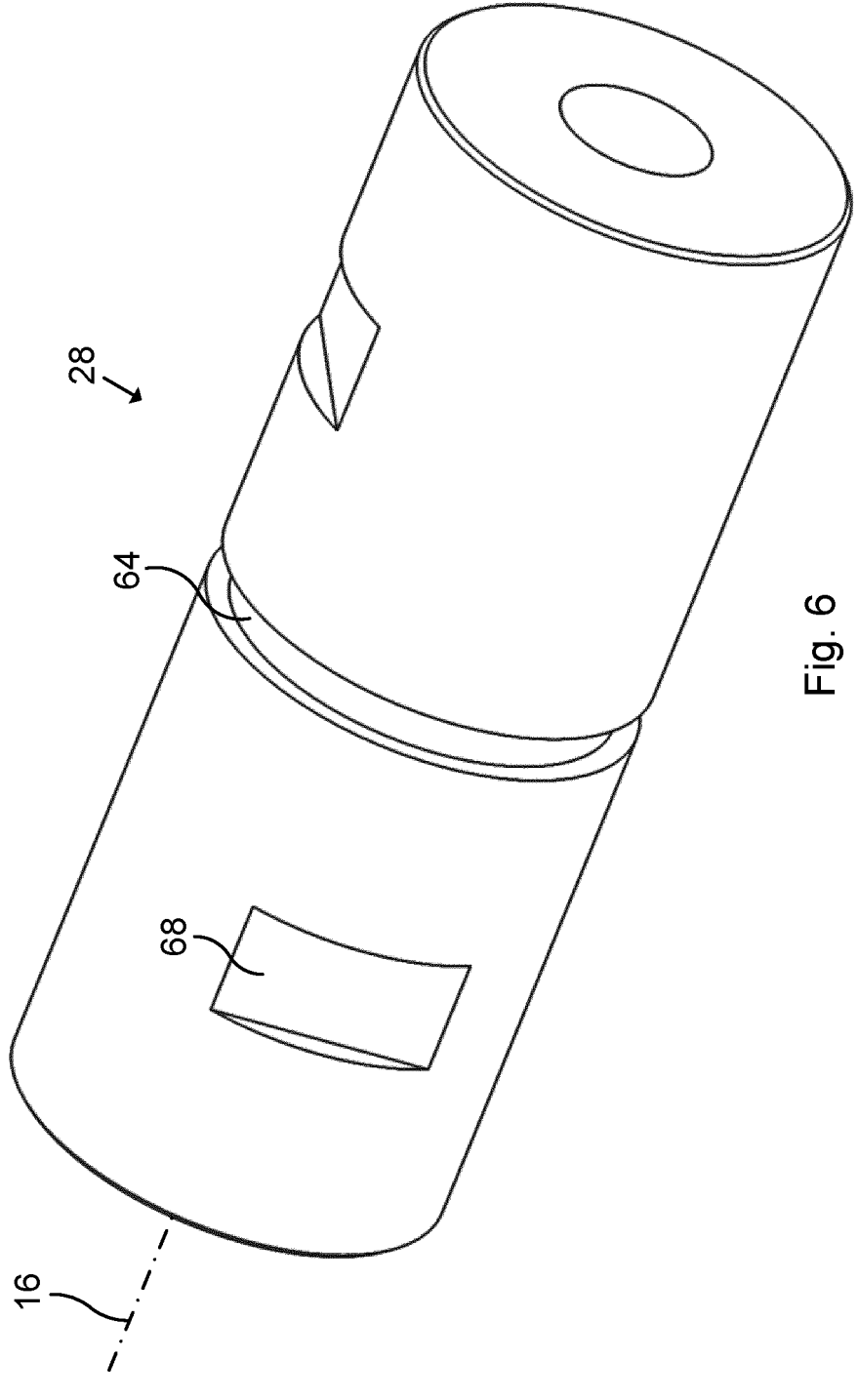
Figure 7:
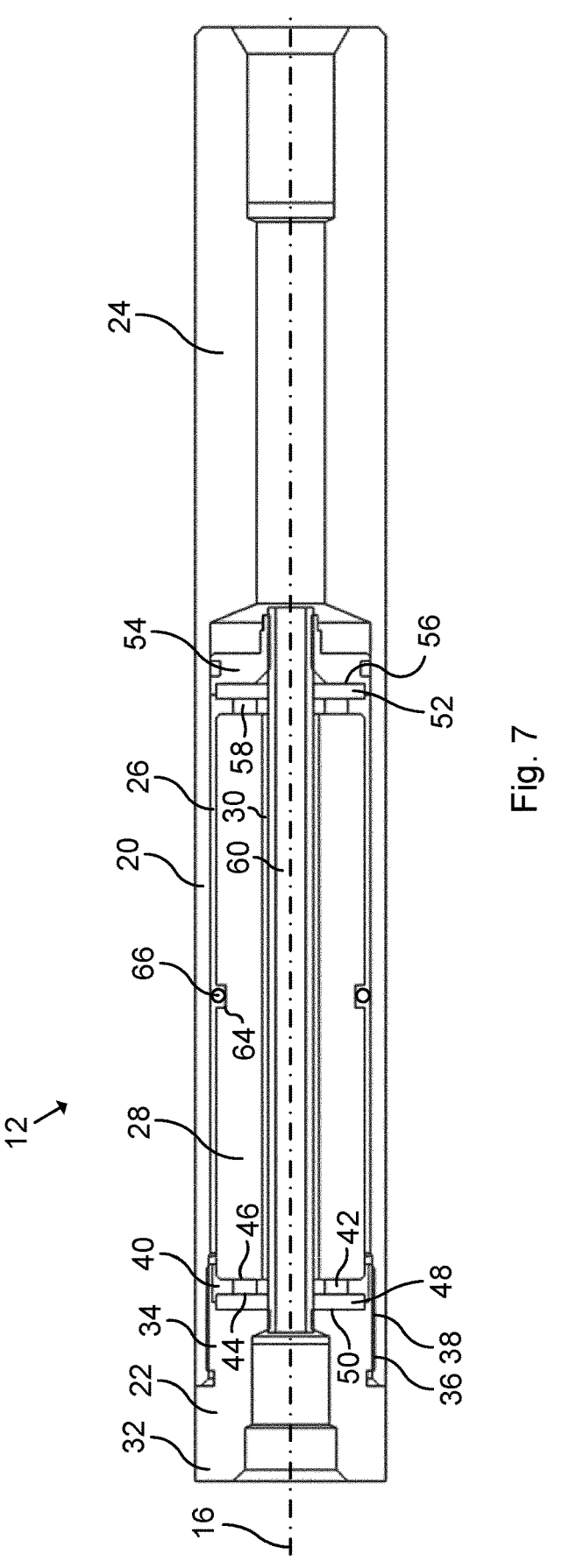
Figure 8:
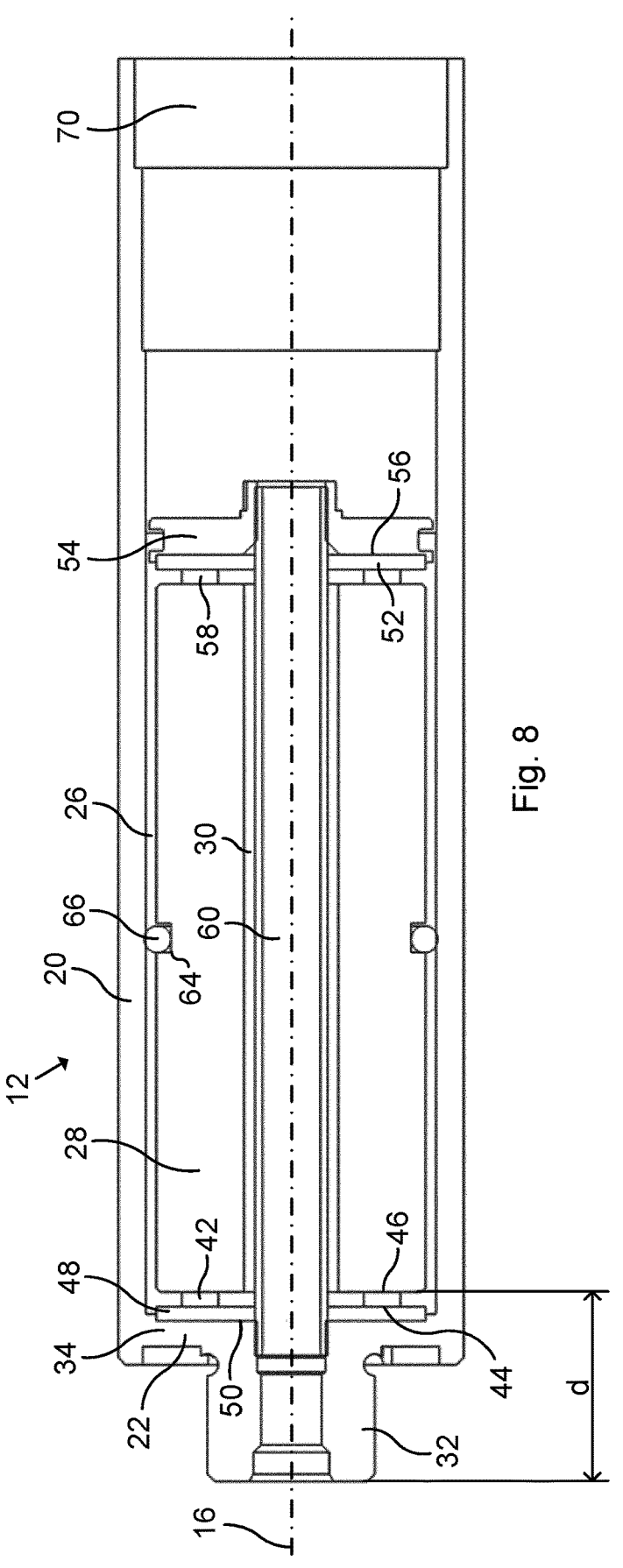

schematically represents a perspective view of an adapter of the tool holder;

FIG. 6: schematically represents a perspective view of a further example of a damping mass for the tool holder;

FIG. 7: schematically represents a cross-sectional side view of a further example of a tool holder; and FIG. 8: schematically represents a cross-sectional side view of a further example of a tool holder.

DETAILED DESCRIPTION

In the following, a tool holder having an adapter with an opening for receiving a damping mass, a tool assembly comprising such tool holder, a tool holder having an adapter integrated with a tubular element, a tool assembly comprising such tool holder, a tool holder having a damping mass that is balanced prior to assembly of the damping mass into a tubular element, and a tool assembly comprising such tool holder, will be described. The same or similar reference numerals will be used to denote the same or similar structural features.

Figure 1:
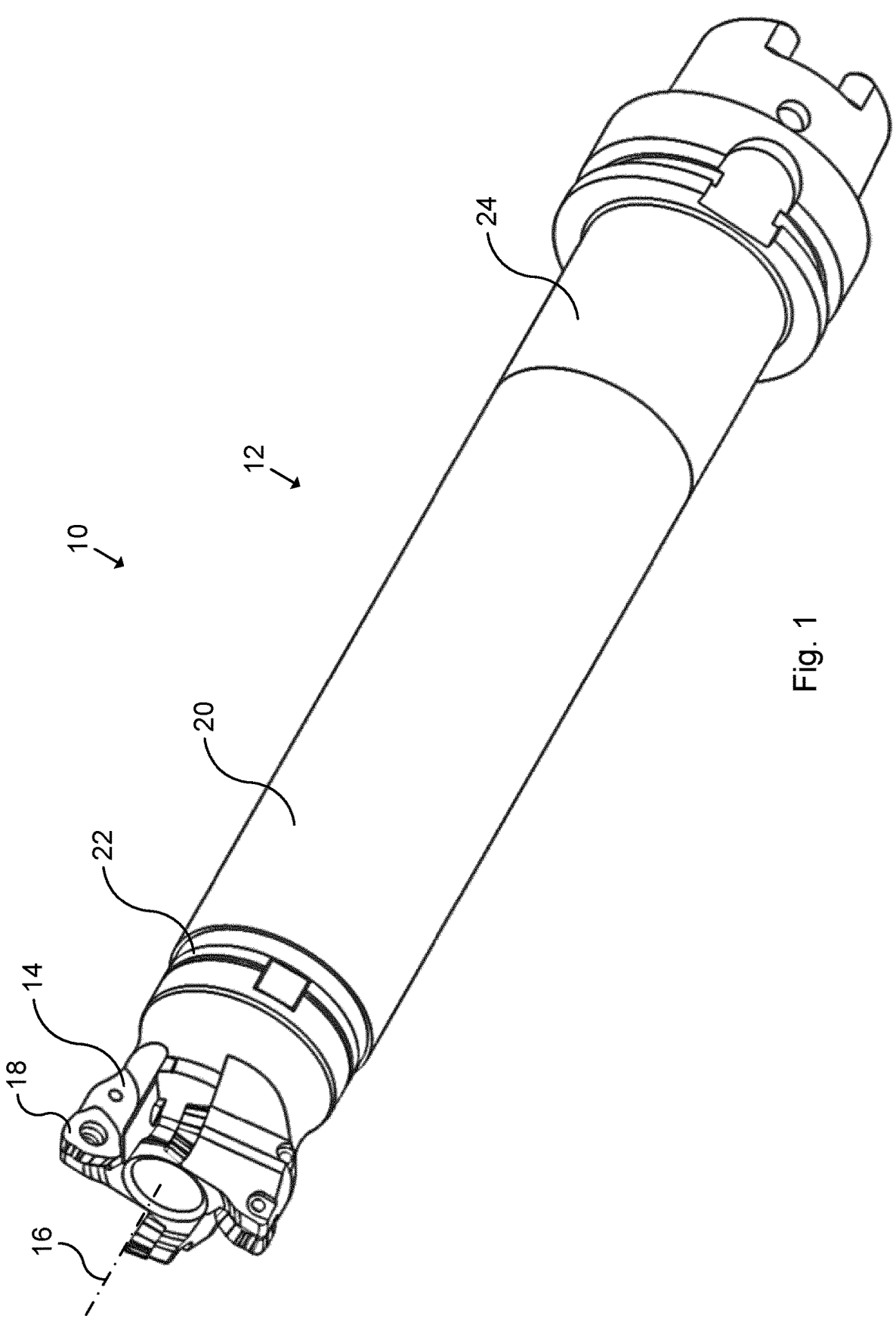
FIG. 1: schematically represents a perspective view of a tool assembly comprising a tool holder and an end effector.

FIG. 1 schematically represents a perspective view of a tool assembly 10, here exemplified as a milling tool. The tool assembly 10 comprises a tool holder 12 and an end effector 14, here exemplified as a milling head, connected to the tool holder 12. FIG. 1 further shows a central axis 16 of the tool assembly 10.

The end effector 14 comprises a plurality of cutting teeth 18 for machining a workpiece (not shown). The end effector 14 of this example comprises four cutting teeth 18.

As shown in FIG. 1, the tool holder 12 comprises a tubular element 20 and an adapter 22. Each of the tubular element 20 and the adapter 22 is concentric with the central axis 16. The end effector 14 is secured to the tubular element 20 by means of the adapter 22.

The tool holder 12 further comprises a back end 24. The back end 24 can be connected to a support (not shown) for supporting the tool assembly 10. During machining of a workpiece, there is a relative rotation between the tool assembly 10 and the workpiece about the central axis 16. That is, either the tool assembly 10 rotates and the workpiece is stationary, or vice versa.

Figure 2:
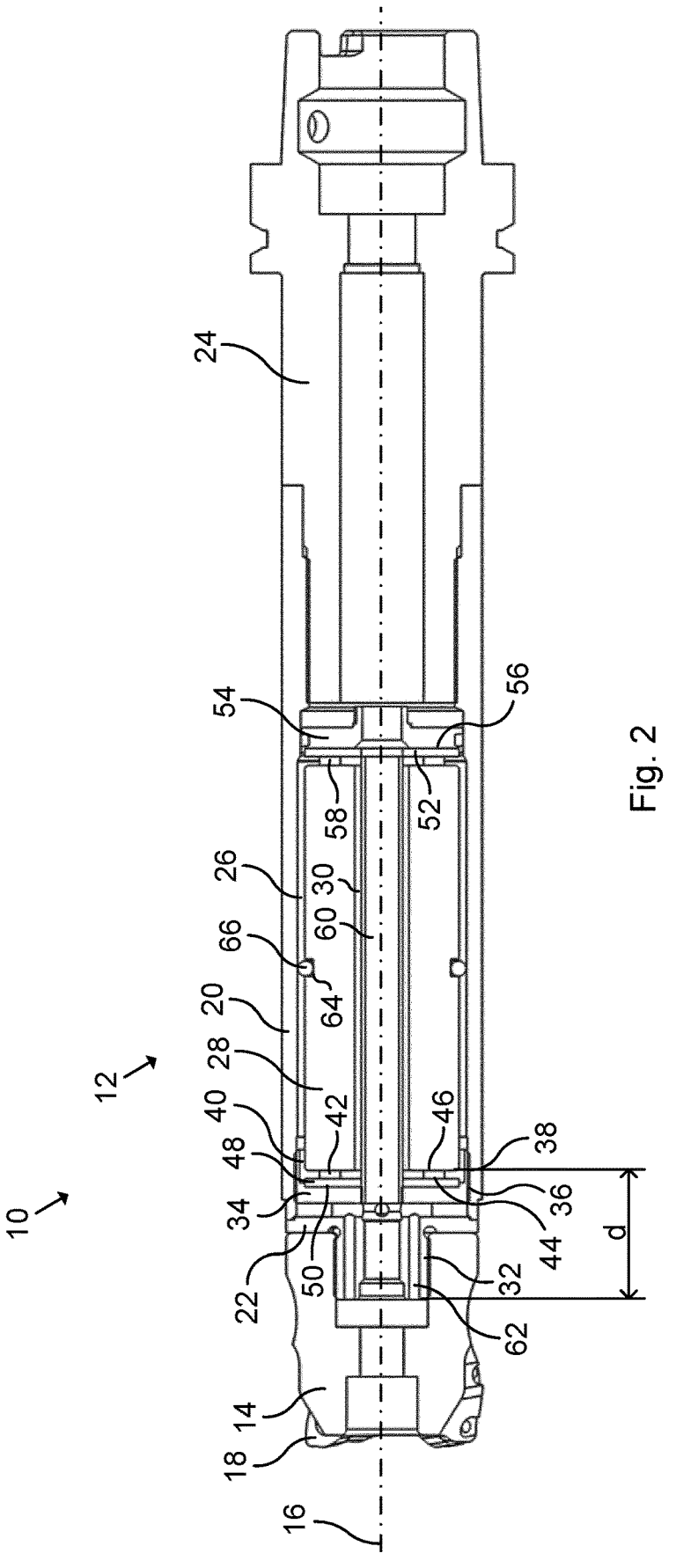
FIG. 2: schematically represents a cross-sectional side view of the machine tool.
Figure 3:
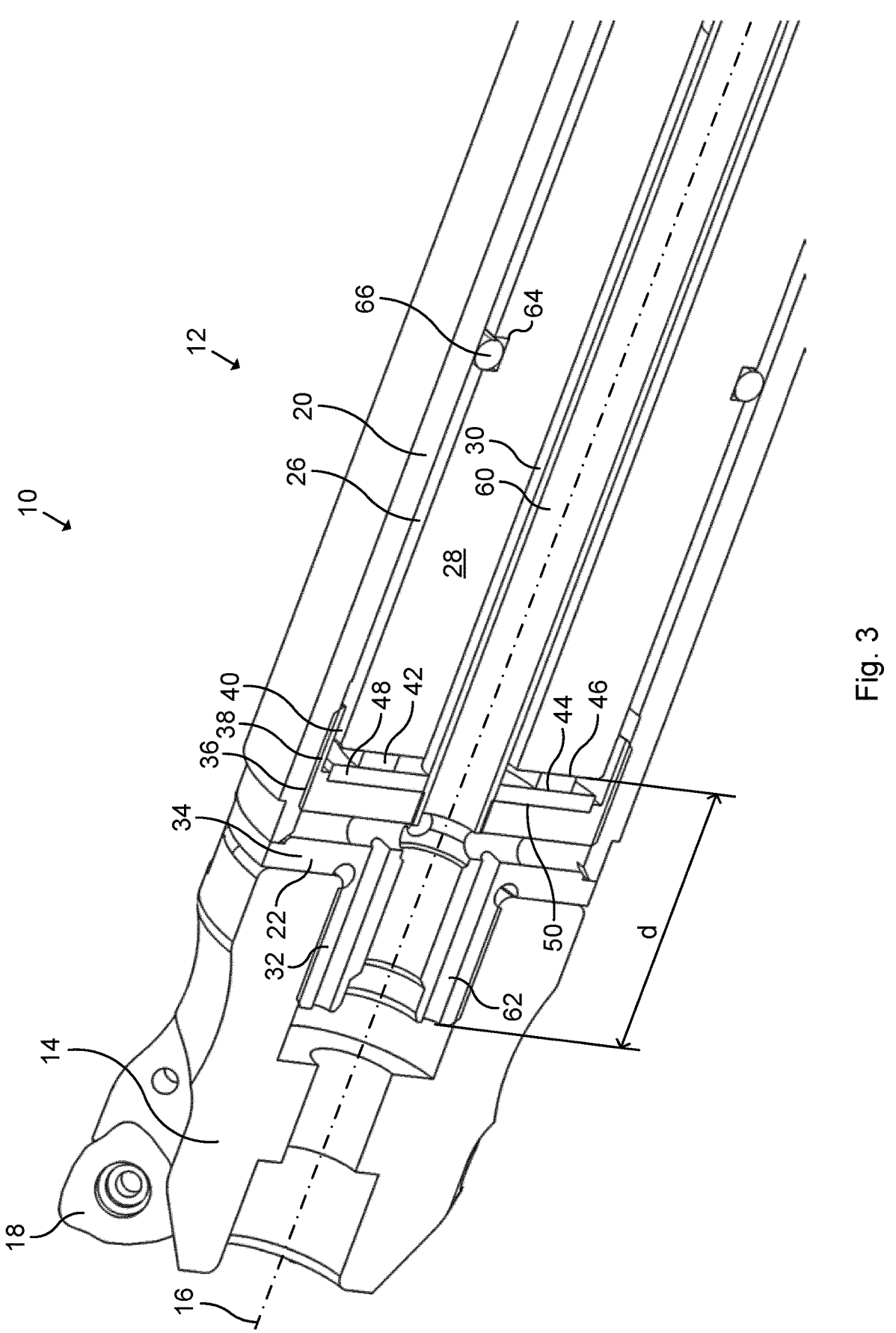
FIG. 3: schematically represents a partial cross-sectional perspective view of the tool assembly.

FIG. 2 schematically represents a cross-sectional side view of the tool assembly 10. FIG. 3 schematically represents a partial cross-sectional perspective view of the tool assembly 10. With collective reference to FIGS. 2 and 3, the tubular element 20 comprises a cavity 26. The tubular element 20 is cylindrical.

The tool assembly 10 further comprises a damping mass 28. The damping mass 28 is arranged inside the cavity 26. During machining operations by the tool assembly 10, vibrations cause the damping mass 28 to move radially with respect to the central axis 16 and relative to the tubular element 20. The vibrations also cause the damping mass 28 to move axially with respect to the central axis 16.

The damping mass 28 is cylindrical and comprises two end surfaces. The damping mass 28 comprises a central mass cavity 30. The damping mass 28 may be made of high-density materials, such as tungsten alloys.

The adapter 22 comprises a front part 32 and a rear part 34. The front part 32 is positioned closer to the end effector 14 and the rear part 34 is positioned closer to the back end 24.

The rear part 34 comprises an external thread 36. The tubular element 20 comprises an internal thread 38. The external thread 36 threadingly engages the internal thread 38 to thereby form a threaded engagement. In this way, the adapter 22 is fixed to the tubular element 20. The external thread 36 may handed such that the cutting force tightens the threaded engagement. The threaded engagement can thereby provide a higher fixing force than prior art solutions employing pins for securing an adapter to a tubular element. Due to the pitch sections of the threaded engagement, the surface area where shear stress is distributed is higher than such prior art solutions. Glue may also be introduced to the threaded engagement to improve fatigue resistance of the threaded engagement.

The rear part 34 comprises an opening 40. The damping mass 28 is partly received in the opening 40. This enables a distance d between a front end of the damping mass 28 and a front end of the adapter 22 to be reduced. This improves the surface finish capability of the tool assembly 10.

A radial clearance is established between an outer diameter of the damping mass 28 and an inner diameter of the opening 40. The opening 40 is circular and concentric with the central axis 16.

As shown in FIGS. 2 and 3, a rear end of the opening 40 is aligned with a rear end of the external thread 36. A front end of the external thread 36 is positioned in front of a front end of the opening 40. The opening 40 is thus arranged radially inside the external thread 36. Moreover, the opening 40 and the external thread 36 are overlapping along the central axis 16.

The front part 32 comprises an internal thread (not denoted). The internal thread of the front part 32 can be threadingly engaged by a bolt (not shown) in order to secure the end effector 14 to the adapter 22.

The tool holder 12 further comprises a front elastic element 42. The front elastic element 42 is arranged to damp vibrations of the damping mass 28, in particular radial vibration movements. The front elastic element 42 is arranged between the adapter 22 and the damping mass 28. The front elastic element 42 comprises a front surface 44 and a rear surface 46. The front surface 44 is rigidly connected to the front surface of the damping mass 28.

The rear surface 46 is rigidly connected to the rear surface of the front plate 48.

Each of the front surface 44 and the rear surface 46 is perpendicular to the central axis 16. The perpendicular orientation of the front surface 44 and the rear surface 46 to the central axis 16 causes the front elastic element 42 to mainly experience shear stresses. This enables the front elastic element 42 to be made very thin, for example only 1 mm. Since the front elastic element 42 can be made thin, the damping mass 28 can be moved even more close to the end effector 14.

The rear surface 46 directly contacts the front end surface of the damping mass 28. The front elastic element 42 is concentric with the central axis 16.

The tool holder 12 of this example further comprises a front plate 48, here exemplified as a circular thermal insulation plate. The front plate 48 is in contact with the adapter 22. The front surface 44 directly contacts a rear end surface of the front plate 48. The front plate 48 is concentric with the central axis 16.

The rear part 34 of this example further comprises an adapter aperture 50. The front plate 48 is received in the adapter aperture 50 by means of an engineering fit. This improves alignment of the damping mass 28 with the central axis 16.

The front plate 48 may be locked to the adapter 22 with glue, such as instant glue. Alternatively, the front plate 48 may be rotatable relative to the adapter 22. In this case, grease may be applied between the front plate 48 and the adapter aperture 50. The grease enables an improved transmission of vibration energy in comparison to air.

In this example, the front elastic element 42 is arranged between the front plate 48 and the damping mass 28. The front surface 44 directly contacts the front plate 48.

The tool holder 12 of this example further comprises a rear plate 52 and a tail lock 54. The rear plate 52 is arranged between the damping mass 28 and the tail lock 54. The rear plate 52 has the same configuration as the front plate 48. The rear plate 52 is in contact with the tail lock 54.

The tail lock 54 comprises a tail lock aperture 56. The rear plate 52 is received in the tail lock aperture 56. This improves alignment of the damping mass 28 with the central axis 16.

The tool holder 12 of this example further comprises a rear elastic element 58. The rear elastic element 58 is arranged between the damping mass 28 and the tail lock 54. In this example, the rear elastic element 58 is arranged between the damping mass 28 and the rear plate 52. The rear elastic element 58 may have the same configuration as the front elastic element 42. Alternatively, the rear elastic element 58 may differ in size and material comparing to the front elastic element 42. Each elastic element 42, 58 may be a viscoelastic element.

Each elastic element 42, 58 is self-adhesive. The front elastic element 42 is adhered to the front plate 48 and to the damping mass 28. The rear elastic element 58 is adhered to the damping mass 28 and to the rear plate 52.

The tool holder 12 further comprises a fluid pipe 60. The fluid pipe 60 passes through the mass cavity 30. The fluid pipe 60 also passes through a through-hole in each of the plates 48, 52 and in each of the elastic elements 42, 58. The fluid pipe 60 is threadingly connected to the adapter 22 and threadingly connected to the tail lock 54. The fluid pipe 60 is thereby fixed to each of the adapter 22 and the tail lock 54. Sealing glue is also provided to these thread connections. The fluid pipe 60 is configured to convey coolant towards the end effector 14. The fluid pipe 60 is concentric with the central axis 16.

In case the adapter aperture 50 and the tail lock aperture 56 are omitted, each of the front plate 48 and the rear plate 52 may be fitted to the fluid pipe 60 by means of an engineering fit. Also in this way, the damping mass 28 can be aligned with the central axis 16.

The adapter 22 further comprises coolant channels 62. The coolant channels 62 are arranged to provide high pressure coolant from the fluid pipe 60 to the end effector 14. In this example, the coolant channels 62 each extends parallel with the central axis 16.

The damping mass 28 comprises a groove 64. The groove 64 extends around the circumference of the damping mass 28 and is concentric with the central axis 16. The groove 64 of this example is centered on the damping mass 28 along the central axis 16.

The tool holder 12 of this example further comprises a lateral stiffness ring 66. The lateral stiffness ring 66 is seated in the groove 64. The lateral stiffness ring 66 is in contact with both the damping mass 28 and with an internal surface of the tubular element 20 that delimits the cavity 26. This improves alignment of the damping mass 28 with the central axis 16.

The damping mass 28 is supported by the elastic elements 42, 58 and by the lateral stiffness ring 66. The supporting stiffness of the damping mass 28 thus composes the stiffness from the elastic elements 42, 58 and the lateral stiffness ring 66. The lateral stiffness ring 66 preferably contributes to less than 30% of the total stiffness to support the damping mass 28. Vibrational energy is damped out by relative motion inside each of the elastic elements 42, 58 and the lateral stiffness ring 66.

The lateral stiffness ring 66 may be made of a material different from a material of the elastic elements 42, 58, or of a different grade of the same material (e.g. natural rubbers of the grades NBR 70 and NBR 90). The lateral stiffness ring 66 may for example be made of a material with low creep property, such as natural rubber, silicon rubber, elastomer or other polymeric materials.

In any case, the elastic elements 42, 58 mainly contribute to convert vibration energy into heat, whereas the lateral stiffness ring 66 mainly or only counteracts the weight drifting of the damping mass 28 and the centrifugal force on the damping mass 28 due to high speed rotations.

The elastic elements 42, 58 are subjected to radial movements when the tool assembly 10 is under cyclic load. The elastic elements 42, 58 may be made of a material having a frequency dependent stiffness to provide a self-tuning effect.

Figure 4:
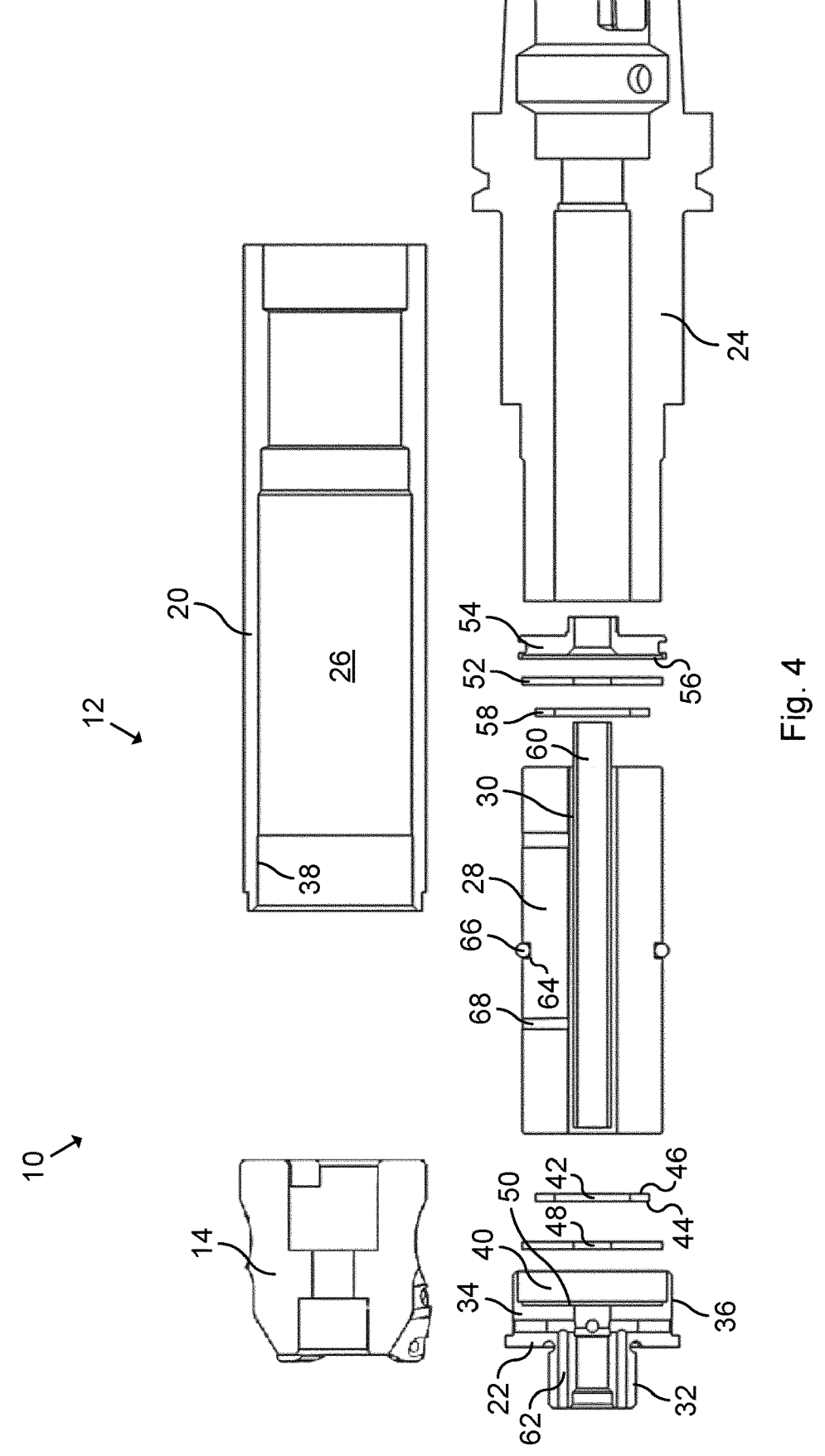
FIG. 4: schematically represents a partly exploded cross-sectional side view of the tool assembly.

FIG. 4 schematically represents a partly exploded cross-sectional side view of the tool assembly 10. When the tool holder 12 for example rotates at 10 000 rpm, the damping mass 28 will typically require a balancing below 10 g*mm to avoid balancing related problems, such as cyclic loads. In order to balance the damping mass 28, the damping mass 28 is first measured on a balancing machine. In response to the balancing measurements, material is then removed from the damping mass 28 to thereby create one or more balancing apertures 68 at one or more locations along the central axis 16 such that the damping mass 28 becomes balanced. The damping mass 28 in FIG. 4 comprises two balancing apertures 68, each exemplified as a drilled radial blind hole from an exterior surface of the damping mass 28.

The tool holder 12 of this example further comprises damping liquid in the mass cavity 30 between the damping mass 28 and the fluid pipe 60. The damping liquid may be a viscous liquid, such as oil. Since the balancing apertures 68 do not extend through the damping mass 28 (blind holes in this example), leakage of damping liquid through the damping mass 28 is avoided.

The damping mass 28 may be balanced to satisfy the balancing grade G6.3, such as to satisfy the balancing grade G2.5, such as to satisfy the balancing grade G1 according to ISO 1940-1:2003. After balancing of the damping mass 28, the tool holder 12 is assembled.

The tool holder 12 may for example have a mass of 5.5 kg. In this case, the damping mass 28 may have a mass of 1.5 kg. The mass of the damping mass 28 may be 20% to 40% of the mass of the tool holder 12.

For a tool holder 12 with a mass of 5.5 kg having a damping mass 28 with a mass of 1.5 kg, the tool holder 12 may be tuned for a vibration frequency at 300 Hz. This means that a total stiffness supporting the mass is approximately $5.3*10^6$ N/m, governed by the equation:

$$K_{total}=(f*2\pi)^2*m$$

where $K_{total}$ is the total stiffness (of the elastic elements 42, 58 and the lateral stiffness ring 66 in this example), f is the tuned vibration frequency, and m is the mass of the damping mass 28.

If the lateral stiffness ring 66 is set to have a stiffness of 30% of the total stiffness for supporting the damping mass 28, the stiffness of the lateral stiffness ring 66 is approximately $1.6*10^6$ N/m. The gravity force of the damping mass 28 is about 15 N when the central axis 16 is horizontal. This gravity force will lead to a displacement of about 0.01 mm and lead to an unbalancing of 15 g*mm, which is acceptable.

In case the tool holder 12 comprises only one elastic element, i.e. the front elastic element 42 but not the rear elastic element 58, the supporting stiffness is reduced and the mass of the damping mass 28 can be reduced. A reduction of the mass of the damping mass 28 will further reduce the production cost. A reduction of the mass of the damping mass 28 is also advantageous since the space within the cavity 26 is limited. A lower mass of the damping mass 28 also reduces the static deflection of the tool assembly 10 due to gravity. The lateral stiffness ring 66 may still be provided in the groove 64 to counteract drifting of the damping mass 28 due to gravity/weight and centrifugal forces.

The stiffness of the front elastic element 42 may be pre-selected to tune the damping mass 28, in accordance with the equation:

$$f = \frac{1}{2\pi}\sqrt{\frac{k}{m}}$$

where m is the mass of the damping mass 28, k is the stiffness of the front elastic element 42 and f is the tuned vibration frequency of the tool assembly 10. The mass m of the damping mass 28 may be pre-selected. The tuned vibration frequency f may be determined by the structure of the tool assembly 10.

Figure 5:
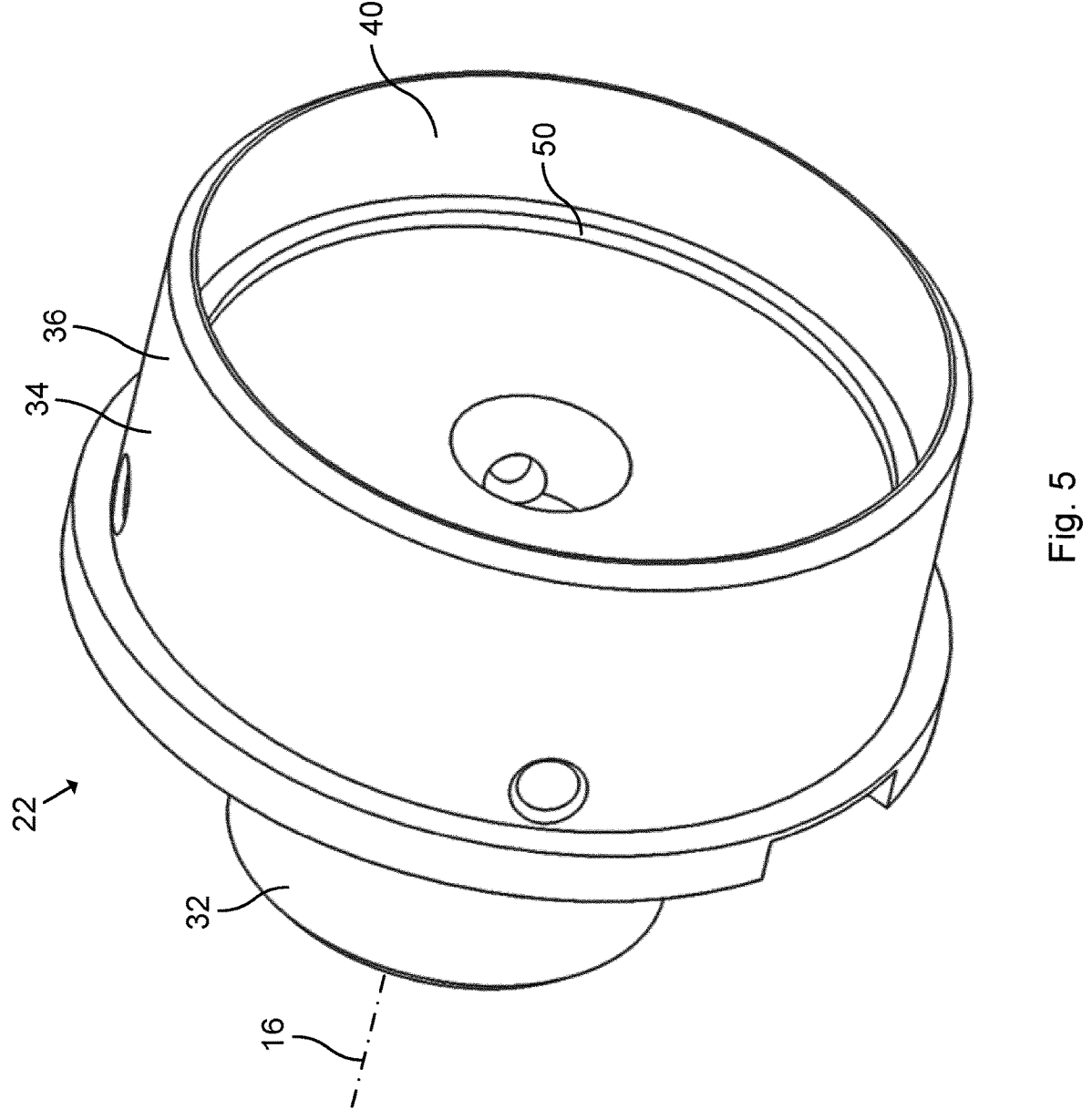
FIG. 5.

FIG. 5 schematically represents a perspective view of the adapter 22. In FIG. 5, the opening 40 and the adapter aperture 50 can be seen more clearly. The internal diameter of the opening 40 is larger than the internal diameter of the adapter aperture 50.

FIG. 6 schematically represents a perspective view of a further example of a damping mass 28 for the tool holder 12. The damping mass 28 in FIG. 6 differs from the damping mass 28 in FIGS. 2-4 by the location and configuration of the balancing apertures 68. The damping mass 28 in FIG. 6 comprises two balancing apertures 68, each being configured as a square cut-out in the damping mass 28. Moreover, the balancing apertures 68 are angularly offset with respect to the central axis 16.

FIG. 7 schematically represents a cross-sectional side view of a further example of tool holder 12. Mainly differences with respect to FIGS. 1-5 will be described. The tool holder 12 in FIG. 7 is for a tool assembly 10 in the form of a milling tool. In FIG. 7, the milling head is omitted. The front part 32 of the adapter 22 has an external larger diameter. An outer surface of the front part 32 is aligned with an outer surface of the tubular element 20. Moreover, the tubular element 20 and the back end 24 are integrally formed.

FIG. 8 schematically represents a cross-sectional side view of a further example of a tool holder 12. Mainly differences with respect to FIGS. 1-5 will be described. In FIG. 8, the adapter 22 is integrally formed with the tubular element 20. In addition to the cavity 26, the combined adapter 22 and tubular element 26 does not comprise an additional opening (like opening 40 in FIGS. 2-5) for accommodating the damping mass 28.

The integrated adapter 22 and the tubular element 20 may be fixed to the back end 24 in various ways. In FIG. 8, the tubular element 20 comprises a rear opening 70 for receiving the back end 24. The front plate 48, the front elastic element 42, the damping mass 28, the lateral stiffness ring 66, the rear elastic element 58, the rear plate 52 and the tail lock 54 may be inserted into the tubular element 20 through the rear opening 70.

The rear opening 70 may comprise an internal thread for threadingly engaging an external thread of the back end 24. The damping mass 28 is arranged between the adapter 22 and the rear opening 70.

Since the adapter 22 is integrally formed with the tubular element 20, a connection between the adapter 22 and the tubular element 20, which may add length to the tool holder 12, can be avoided. This enables the distance d between the front end of the damping mass 28 and the front end of the adapter 22 to be reduced. This improves the surface finish capability of a tool assembly 10 comprising the tool holder 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A tool holder for a tool assembly, the tool holder comprising:

a tubular element having a cavity and a central axis;

a damping mass arranged within the cavity and movable radially with respect to the central axis and relative to the tubular element;

an adapter having a rear part fixed to the tubular element, and a front part for connection to an end effector of the tool assembly, the rear part comprising an internal sidewall that defines an opening having an internal diameter, and the damping mass is at least partly received in the opening with a radial clearance;

an elastic element positioned between the adapter and the damping mass, the elastic element being arranged to support the damping mass and to damp radial vibrational movements of the damping mass relative to the tubular element, and the elastic element comprising a front planar surface substantially perpendicular to the central axis and a rear planar surface substantially perpendicular to the central axis; and a plate positioned between the adapter and the damping mass, wherein:

the rear planar surface of the elastic element is directly connected to the damping mass, the rear part further comprises an adapter aperture that has a sidewall that defines an internal width measured perpendicular to the central axis that is smaller than the internal diameter of the opening, the plate is seated in the adapter aperture such that the plate is spaced from the internal sidewall of the rear part, the plate is the only plate directly connected to the elastic element, the elastic element is subjected to stress in order to transmit radial vibrational movements to and damp radial vibrational movements of the damping mass, and a majority of the stress is shear stress.

2. The tool holder according to claim 1, wherein the rear part is fixed to the tubular element by means of threads.

3. The tool holder according to claim 2, wherein the rear part is fixed to the tubular element by means of glue.

4. The tool holder according to claim 1, wherein the plate is positioned relative to the adapter via an engineering fit.

5. The tool holder according to claim 1, wherein the elastic element has a thickness of less than 2 mm.

6. The tool holder according to claim 1, wherein the damping mass is balanced to satisfy the balancing grade G6.3 according to ISO 1940-1:2003 prior to assembly of the damping mass into the tubular element.

7. The tool holder according to claim 1, further comprising a lateral stiffness ring, wherein the damping mass comprises a groove, and wherein the lateral stiffness ring is seated in the groove and is in contact with the tubular element.

8. The tool assembly of claim 1, wherein each of the adapter and the tubular element has an inner surface, and wherein the elastic element has a radial clearance from and does not contact either of the inner surfaces.

9. The tool assembly of claim 1, wherein:

the damping mass comprises a hollow, cylindrically-shaped body having an inner cylinder diameter and an outer cylinder diameter;

the elastic element comprises a flat, ring-shaped body having an inner ring diameter and an outer ring diameter;

the inner cylinder diameter is smaller than the inner ring diameter; and the outer ring diameter is smaller than the outer cylinder diameter.

10. A tool assembly comprising an end effector and a tool holder according to claim 1.

* * * * *